United States Patent
Pruett

(10) Patent No.: US 6,628,094 B2
(45) Date of Patent: Sep. 30, 2003

(54) METHOD AND APPARATUS FOR CANCELING RIPPLE CURRENT IN A LAMP

(75) Inventor: Henry Frazier Pruett, Sandy, OR (US)

(73) Assignee: InFocus Corporation, Wilsonville, OR (US)

(*) Notice: Subject to any disclaimer, the term of this patent is extended or adjusted under 35 U.S.C. 154(b) by 0 days.

(21) Appl. No.: 10/208,986

(22) Filed: Jul. 30, 2002

(65) Prior Publication Data

US 2002/0195976 A1 Dec. 26, 2002

Related U.S. Application Data

(63) Continuation of application No. 09/750,388, filed on Dec. 27, 2000.

(51) Int. Cl.$^7$ .............................. H05B 37/02; G05F 1/40
(52) U.S. Cl. ......................... 315/291; 315/244; 323/269
(58) Field of Search .................................. 315/291, 224, 315/244, 283, 289, 276, 209 R, 240, 246, 248, 247; 323/280–282, 285, 269

(56) References Cited

U.S. PATENT DOCUMENTS

| | | | | |
|---|---|---|---|---|
| 4,079,292 A | * | 3/1978 | Kaneda ..................... | 315/289 |
| 4,170,747 A | | 10/1979 | Holmes .................... | 315/307 |
| 4,291,254 A | | 9/1981 | Arlt et al. .................. | 315/240 |
| 4,388,128 A | | 6/1983 | Ogawa et al. ............... | 156/64 |
| 4,523,102 A | | 6/1985 | Kazufumi et al. ........... | 250/578 |
| 4,621,275 A | | 11/1986 | Ueno et al. ................. | 357/30 |
| 4,734,624 A | | 3/1988 | Nagase et al. .............. | 315/243 |
| 4,868,463 A | | 9/1989 | Dorleijn et al. ............. | 315/326 |
| 4,912,374 A | | 3/1990 | Nagase et al. .............. | 315/244 |
| 4,952,849 A | | 8/1990 | Fellows et al. ............. | 315/307 |
| 4,963,796 A | | 10/1990 | Gottschling et al. ........ | 315/246 |
| 5,198,727 A | | 3/1993 | Allen et al. ................. | 315/291 |
| 5,204,809 A | * | 4/1993 | Andresen ................... | 363/132 |

(List continued on next page.)

FOREIGN PATENT DOCUMENTS

| | | |
|---|---|---|
| JP | 10162976 | 6/1998 |
| JP | 10247595 | 9/1998 |
| JP | 20003587363 | 12/2000 |
| WO | WO 00/26740 | 5/2000 |

OTHER PUBLICATIONS

Bindra, Ashok, "New–Generation Power Controllers Take Multiphase Route: Bi–Phase Synchronous PWM Controllers Come With On–Chip MOSFET Drivers To Simplify Multiphase Power Supply Design," Oct. 28, 1999, pp. 77–78, 80, 82 & 84, vol. 47, No. 22, XP000928230, ISSN: 0013–4872, Electronic Design, Penton Publishing, Cleveland, OH, USA.

Perreault et al., "Distributed Interleaving of Paralleled Power Converters," IEEE Transactions on Circuits & Systems I: Fundamental Theory and Applications, Aug. 1, 1997, pp. 728–734, vol. 44, No. 8, XP000737485, ISSN: 1057–7122, IEEE Inc., New York, USA.

*Primary Examiner*—Wilson Lee
(74) *Attorney, Agent, or Firm*—Blakely Sokoloff Taylor & Zafman LLP

(57) ABSTRACT

A method and apparatus for reducing ripple current in a projector lamp comprising an electrical network comprising input terminals A and C, and output terminals B and D, including a first inductive element and a second inductive element, each inductive element having a first terminal and a second terminal, with the second terminal of the first inductive element electrically connected with the second terminal of the second inductive element at output terminal B, with the first terminal of the first inductive element connected to input terminal A, and the first terminal of the second inductive element connected to input terminal C; and a means for impressing a first source of switching potential from an external source at input terminal A, and a second source of switching potential from the external source out-of-phase with the first source of switching potential, at input terminal C such that a ripple current across the output terminals B and D is minimum.

11 Claims, 2 Drawing Sheets

U.S. PATENT DOCUMENTS

| | | | |
|---|---|---|---|
| 5,357,173 A | 10/1994 | Kachmarik et al. ...... 315/209 R |
| 5,491,386 A | 2/1996 | Eriguchi et al. ......... 315/209 R |
| 5,606,223 A | 2/1997 | Yamamoto et al. ............ 315/85 |
| 5,608,294 A | 3/1997 | Derra et al. ................. 315/224 |
| 5,814,944 A | 9/1998 | Saito et al. .................. 313/638 |
| 5,859,505 A | 1/1999 | Bergman et al. ............. 315/307 |
| 5,880,561 A | 3/1999 | Miyazaki et al. ........ 315/209 R |
| 5,883,475 A | 3/1999 | Beasley ......................... 8/471 |
| 5,942,860 A | 8/1999 | Huynh ........................ 315/307 |
| 5,952,794 A | 9/1999 | Bergman et al. ............. 315/307 |
| 5,986,729 A | 11/1999 | Yamanaka et al. ............ 349/79 |
| 5,998,939 A | 12/1999 | Fellows et al. .............. 315/246 |
| 6,005,356 A | 12/1999 | Horiuchi et al. ............. 315/307 |
| 6,043,614 A | 3/2000 | Tessnow et al. ............. 315/291 |
| 6,054,815 A | 4/2000 | Sugita et al. ................ 315/244 |
| 6,054,969 A | 4/2000 | Haisma .......................... 345/7 |
| 6,060,829 A | 5/2000 | Kubon et al. ................ 313/631 |
| 6,104,145 A | 8/2000 | Olsen et al. ................. 315/246 |
| 6,111,359 A | 8/2000 | Work et al. .................... 315/56 |
| 6,130,508 A | 10/2000 | Miyazaki et al. ........ 315/209 R |
| 6,144,194 A * | 11/2000 | Varga ......................... 323/285 |
| 6,147,461 A | 11/2000 | Kominami et al. .......... 315/291 |
| 6,169,365 B1 | 1/2001 | Kubon et al. ................ 313/631 |
| 6,191,540 B1 | 2/2001 | Herzberger et al. .......... 315/291 |
| 6,215,252 B1 | 4/2001 | Stanton ...................... 315/224 |
| 6,219,113 B1 | 4/2001 | Takahara ..................... 349/42 |
| 6,225,754 B1 | 5/2001 | Horiuchi et al. ............. 315/246 |
| 6,229,269 B1 | 5/2001 | Olsen ......................... 315/291 |
| 6,232,725 B1 | 5/2001 | Derra et al. ............. 315/209 R |
| 6,239,556 B1 | 5/2001 | Derra et al. ............. 315/209 R |

* cited by examiner

METHOD AND APPARATUS FOR CANCELING RIPPLE CURRENT IN A LAMP

This U.S. Patent application is a continuation of U.S. patent application Ser. No. 09/750,388 filed Dec. 27, 2000.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of lamp devices. In particular, the present invention is related to a method and apparatus for canceling ripple current in a projector lamp.

2. Description of the Related Art

In order to make for a pleasant viewing experience, an image projected by a data or movie projector must be steady. A data projector is a projector that is used to display still (non-moving) images whereas a movie projector is a projector that is used to display moving images. The stability of the projected image is dependant upon the stability of the current that drives the projector's lamp. Unfortunately, the current that drives a projector lamp has an alternating current (AC) component (ripple current). Depending on the magnitude and the frequency of the ripple current, the ripple current excites the quartz envelope of the projector lamp and causes the projector lamp to resonate. A resonating projector lamp causes the gases within the lamp to swirl, and the swirling gases in a projector lamp causes the light emitted by the lamp to flicker, which in turn causes the image projected by the projector to be unsteady and to flicker. The greater the magnitude of the ripple current, the more pronounced is the flicker.

Therefore, in order to eliminate a projector lamp's flicker it is necessary to reduce or to virtually eliminate the ripple current that flows through the lamp. Traditionally, a filter circuit as illustrated in FIG. 1 has been employed to reduce the ripple current. The filter circuit as illustrated, is typically made up of passive components like inductors and capacitors. In order to virtually eliminate the ripple current, one solution is to increase the size of the filter components. However, large inductors and capacitors in the filter circuit is not the optimum solution for a projector wherein the weight of the projector needs to be controlled.

An alternate solution to reducing the ripple current in a projector lamp is to increase the switching frequency of the input current. However, the present state of the art restricts the upper switching frequency limit since, beyond a certain critical frequency, the switching circuit becomes inefficient and generates a larger amount of heat. In a projector, excess heat generation is also undesirable.

What is needed, therefore, is a method and apparatus to virtually eliminate the ripple current in a projector's lamp without generating heat, and without increasing the size of the filtering components.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Described is a method and apparatus for canceling ripple current in a data or movie projector lamp. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description will be presented using terminology commonly employed by those skilled in the art to convey the substance of their work to others skilled in the art. Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
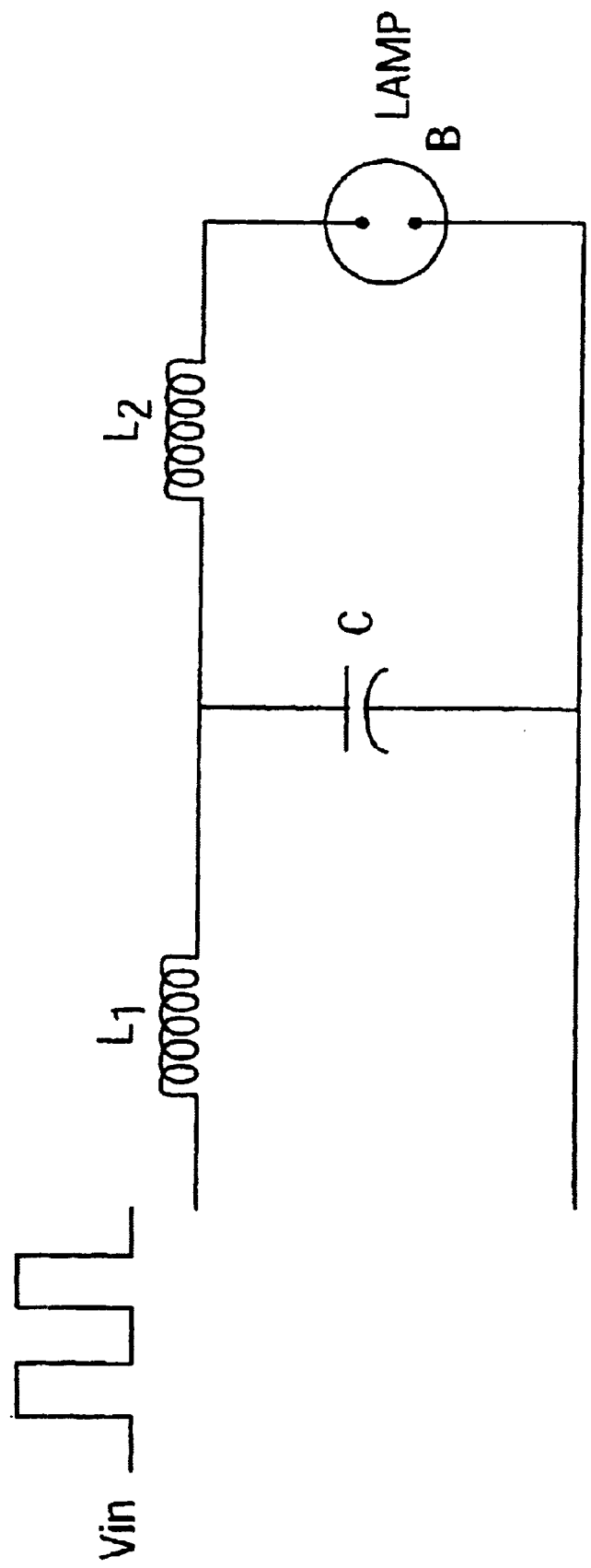
FIG. 1 illustrates a prior art filter circuit for reducing ripple current in a projector lamp.
Figure 2:
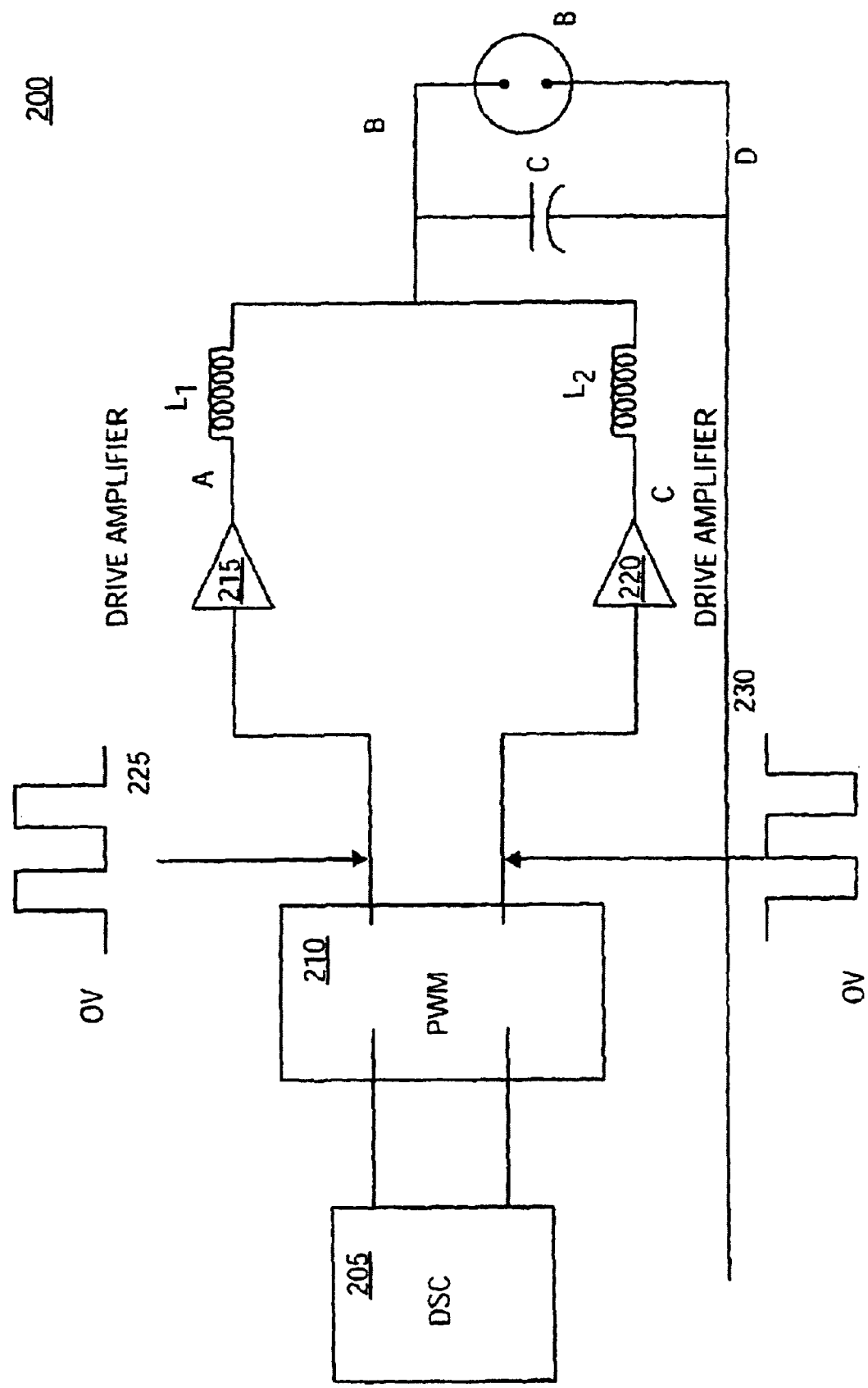
FIG. 2 illustrates an embodiment of a circuit for reducing ripple current in a projector lamp.

FIG. 2 illustrates a block diagram of an embodiment of the invention wherein ripple current is virtually eliminated in projector lamp B of projector 200. The method employed to eliminate the ripple current is a cancellation technique wherein two out-of-phase waveforms of the same magnitude are input at terminals A and C into inductors L1 and L2 respectively. The resultant waveform that is output at terminals B and D has only a direct current (DC) component, and virtually no AC component. In other words, the ripple current at the output of the circuit is virtually eliminated. Because the waveforms are out-of-phase with each other, the AC components of the waveform effectively cancel each other. Thus, the embodiment in FIG. 2 not only eliminates the AC component of the waveform in one filter stage, but also eliminates the AC component of the waveform independent of the frequency of the input waveform, thereby keeping component selection simple.

As FIG. 2 illustrates, oscillator 205 generates two substantially out-of-phase waveforms 225 and 230. Ideally the out-of-phase waveforms are 180 degrees out-of-phase. These out-of-phase waveforms 225 and 230 have substantially the same amplitude and are input into a pulse width modulator 210. One skilled in the art will appreciate that the pulse width modulator modulates the width of the waveforms in accordance with the output power requirements.

Drive amplifiers 215 and 220 match the impedance of the input circuitry with that of the output circuitry, and drive inductive elements L1 and L2. Although FIG. 2 shows an oscillator, a pulse width modulator, and drive amplifiers to generate and to drive inductive elements L1 and L2, one skilled in the art will appreciate that numerous circuits are available to produce and to impress two substantially out-of-phase waveforms of the same amplitude into inductive elements L1 and L2. In FIG. 2, the amplitude of the out-of-phase waveforms is approximately twice that of the voltage appearing across lamp B of projector 200. The frequency of the out-of-phase waveforms is a value that is typically in the range of 50 kilohertz (kHz) to 100 kilohertz (kHz). In one embodiment, inductive elements L1 and L2 are inductors. The out-of-phase waveforms that are input into inductors L1 and L2, are filtered by the inductors and virtually eliminate the ripple current through lamp B.

Ideally, inductors L1 and L2 are perfectly matched, and have values ranging from 100 micro henrys (uH) to 500 microhenrys (uH). Also, ideally the voltages waveforms 225 and 230 are identical to each other except for being out-of-phase with respect to each other. However, since it is physically impracticable to ideally match inductors L1 and L2, and to have waveforms that are identical to each other, the minimal ripple current caused by the mismatch in the circuitry is further eliminated by capacitive element C. In one embodiment, if the ripple current is within permissible levels such that the projector lamp does not flicker for the given ripple current, capacitive element C need not be used in the circuit.

Since the capacitive element C merely filters any residual ripple current in the circuit, the size of the capacitive element C is small as compared with the capacitive elements used in prior art circuits. In one embodiment, capacitive element C is a capacitor, and has a capacitance in the range of 0.01 microfarads (uF) to 0.1 microfarads (uF). The small size of the capacitor in the embodiment of FIG. 2 causes the capacitor to consume less power when charged, thereby generating less heat. In addition, when the projector is initially switched on, capacitor C charges fully in a shorter time period, facilitating the turning on of lamp B.

Thus a method and apparatus has been described that virtually eliminates ripple current in a projector lamp. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. An apparatus comprising:
    a pulse width modulation circuit having a first output to provide a first switched signal and a second output to provide a second switched signal, wherein the first switched signal and the second switched signal are 180° out of phase;
    a first drive amplifier having an input coupled to the first output of the pulse width modulation circuit to receive the first switched signal;
    a second drive amplifier having an input coupled to the second output of the pulse width modulation circuit to receive the second switched signal;
    a first inductive element having an input terminal coupled to an output terminal of the first drive amplifier and an output terminal;
    a second inductive element having an input terminal coupled to an output terminal of the second drive amplifier and an output terminal, the output terminal of the second inductive element coupled with the output terminal of the first inductive element;
    a lamp socket coupled between the output terminals of the first inductive element and the second inductive element and ground; and
    a capacitive element coupled between the output terminals of the first inductive element and the second inductive element and ground.

2. The apparatus of claim 1 further comprising a projector lamp connected to the lamp socket.

3. The apparatus of claim 1 wherein a value of the capacitive element is between 0.01 microFarads and 0.1 microFarads.

4. The apparatus of claim 1 wherein a value of the first inductive element is between 100 microHenrys and 500 microHenrys.

5. The apparatus of claim 1 wherein a value of the second inductive element is between 100 microHenrys and 500 microHenrys.

6. The apparatus of claim 1 wherein a value of the first inductive element is substantially equal to a value of the second inductive element.

7. A projector comprising:
    a pulse width modulation circuit having a first output to provide a first switched signal and a second outnut to provide a second switched signal, wherein the first switched signal and the second switched signal are 180° out of phase;
    a first drive amplifier having an input coupled to the first output of the pulse width modulation circuit to receive the first switched signal;
    a second drive amplifier having an input coupled to the second output of the pulse width modulation circuit to receive the second switched signal;
    a first inductive element having an input terminal coupled to an output terminal of the first drive amplifier and an output terminal;
    a second inductive element having an input terminal coupled to an output terminal of the second drive amplifier and an output terminal, the output terminal of the second inductive element coupled with the output terminal of the first inductive element;
    a capacitive element coupled between the output terminals of the first inductive element and the second inductive element and ground;
    a lamp coupled between the output terminals of the first inductive element and the second inductive element and ground.

8. The projector of claim 7 wherein a value of the capacitive element is between 0.01 microFarads and 0.1 microFarads.

9. The projector of claim 7 wherein a value of the first inductive element is between 100 microHenrys and 500 microHenrys.

10. The projector of claim 7 wherein a value of the second inductive element is between 100 microHenrys and 500 microHenrys.

11. The projector of claim 7 wherein a value of the first inductive element is substantially equal to a value of the second inductive element.

* * * * *